United States Patent
Krug

(10) Patent No.: US 11,558,246 B2
(45) Date of Patent: Jan. 17, 2023

(54) IMPLEMENTING SERVICE FUNCTION CHAINS

(71) Applicant: BRITISH TELECOMMUNICATIONS PUBLIC LIMITED COMPANY, London (GB)

(72) Inventor: Anne-Louise Krug, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/468,121

(22) PCT Filed: Dec. 8, 2017

(86) PCT No.: PCT/EP2017/082111
§ 371 (c)(1),
(2) Date: Jun. 10, 2019

(87) PCT Pub. No.: WO2018/104541
PCT Pub. Date: Jun. 14, 2018

(65) Prior Publication Data
US 2020/0076686 A1    Mar. 5, 2020

(30) Foreign Application Priority Data
Dec. 9, 2016  (EP) .................................. 16203319

(51) Int. Cl.
*H04L 12/24* (2006.01)
*H04L 29/12* (2006.01)
(Continued)

(52) U.S. Cl.
CPC .......... *H04L 41/0806* (2013.01); *H04L 45/74* (2013.01); *H04L 61/50* (2022.05); *H04L 2101/695* (2022.05)

(58) Field of Classification Search
CPC ..... H04L 41/0806; H04L 45/74; H04L 61/20; H04L 61/6095
(Continued)

(56) References Cited

U.S. PATENT DOCUMENTS

2015/0333930 A1    11/2015  Aysola et al.
2016/0205018 A1*    7/2016  Li ......................... H04L 45/021
                                                                    370/392
(Continued)

FOREIGN PATENT DOCUMENTS

| EP | 3 035 607 | 6/2016 |
|---|---|---|
| WO | 2015/062627 | 5/2015 |
| WO | 2016/089400 | 6/2016 |

OTHER PUBLICATIONS

Internet Engineering Task Force, RFC 7665: Service Function Chaining (SFC) Architecture, Oct. 2015 (Year: 2015).*
(Continued)

*Primary Examiner* — Schquita D Goodwin
(74) *Attorney, Agent, or Firm* — Nixon & Vanderhye P.C.

(57) ABSTRACT

Methods and apparatus are disclosed for configuring one or more processors to implement service function chains comprising one or more virtualised service functions. A method according to one aspect, performed by a processing module (330) implemented on one or more processors (30), involves steps being performed in respect of at least one new virtualised service function (33) to be included in a service function chain of: determining a position in the service function chain at which the new virtualised service function (33) is to be included; allocating at least one internal address to the new virtualised service function, the at least one internal address being an address to be usable by a switching processor (34); and providing to the switching processor
(Continued)

(a) Representation of an Initial Service Chain (b) Representation of a Desired Service Chain Addition of a New Virtualised Function

(34) an indication of the at least one internal address allocated to the new virtualised service function (33).

15 Claims, 5 Drawing Sheets

(51) Int. Cl.
   *H04L 12/741*    (2013.01)
   *H04L 41/0806*   (2022.01)
   *H04L 45/74*     (2022.01)
   *H04L 61/50*     (2022.01)
   *H04L 101/695*   (2022.01)

(58) Field of Classification Search
   USPC .......................................................... 709/223
   See application file for complete search history.

(56) References Cited

U.S. PATENT DOCUMENTS

| | | | |
|---|---|---|---|
| 2016/0241436 A1* | 8/2016 | Fourie | H04L 47/2425 |
| 2016/0248858 A1 | 8/2016 | Qiu et al. | |
| 2016/0308981 A1* | 10/2016 | Cortes Gomez | H04L 41/0826 |
| 2016/0344565 A1* | 11/2016 | Batz | H04M 15/8044 |
| 2016/0344803 A1* | 11/2016 | Batz | H04M 15/66 |
| 2017/0237656 A1* | 8/2017 | Gage | H04L 61/2521 |
| | | | 370/392 |
| 2018/0026887 A1* | 1/2018 | Nainar | H04L 12/4641 |
| | | | 370/392 |
| 2018/0091420 A1* | 3/2018 | Drake | H04L 67/327 |
| 2019/0222521 A1* | 7/2019 | Flinck | H04L 41/0897 |

OTHER PUBLICATIONS

International Search Report and Written Opinion of the ISA for PCT/EP2017/082111, dated Feb. 28, 2018, 7 pages.
Search and Examination Report for GB 1621011.4, dated May 26, 2017, 6 pages.
Search and Examination Report for GB 1720546.9, dated Jun. 11, 2018, 6 pages.
Search Report for EP16203319.5, dated May 4, 2017, 12 pages.
Carl-Mitchell et al., Using ARP to Implement Transparent Subnet Gateways, ARP and Transparent Subnet Gateways , RFC 1027, Oct. 1987, 8 pages.
Bottorff et al., "Ethernet MAC Chaining" , Network Working Group, Jul. 21, 2016, 23 pages.
Man, "OVS-OFCTL", administrator OpenFlow Switches, OSVA-OFATL, http://manpages.ubuntu.com/manpages/tnisty/man8/ovs-ofctl.8.html, retrieved Jun. 5, 2019, 19 pages.
ONF Open Networking Foundation, "OpenFlow", 2016, 1 page.
Zhang et al., "L4-L7 Service Function Chaining Solution Architecture", Open Networking Foundation, version 1.0, Jun. 14, 2015, 36 pages.
Office Action dated Jul. 1, 2020 issued in European Application No. 17 816 674.0 (11 pages).

* cited by examiner

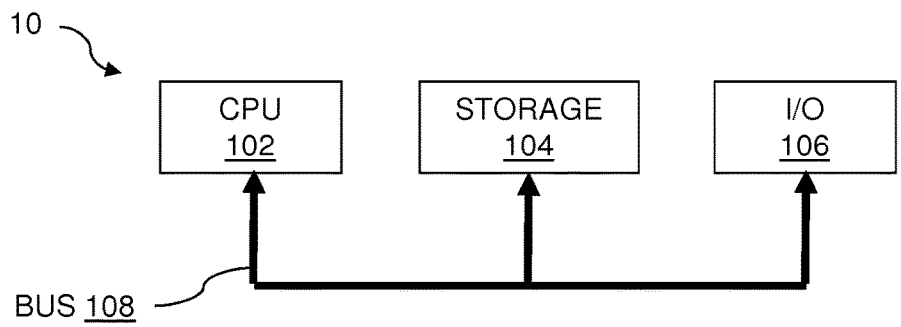
Figure 1
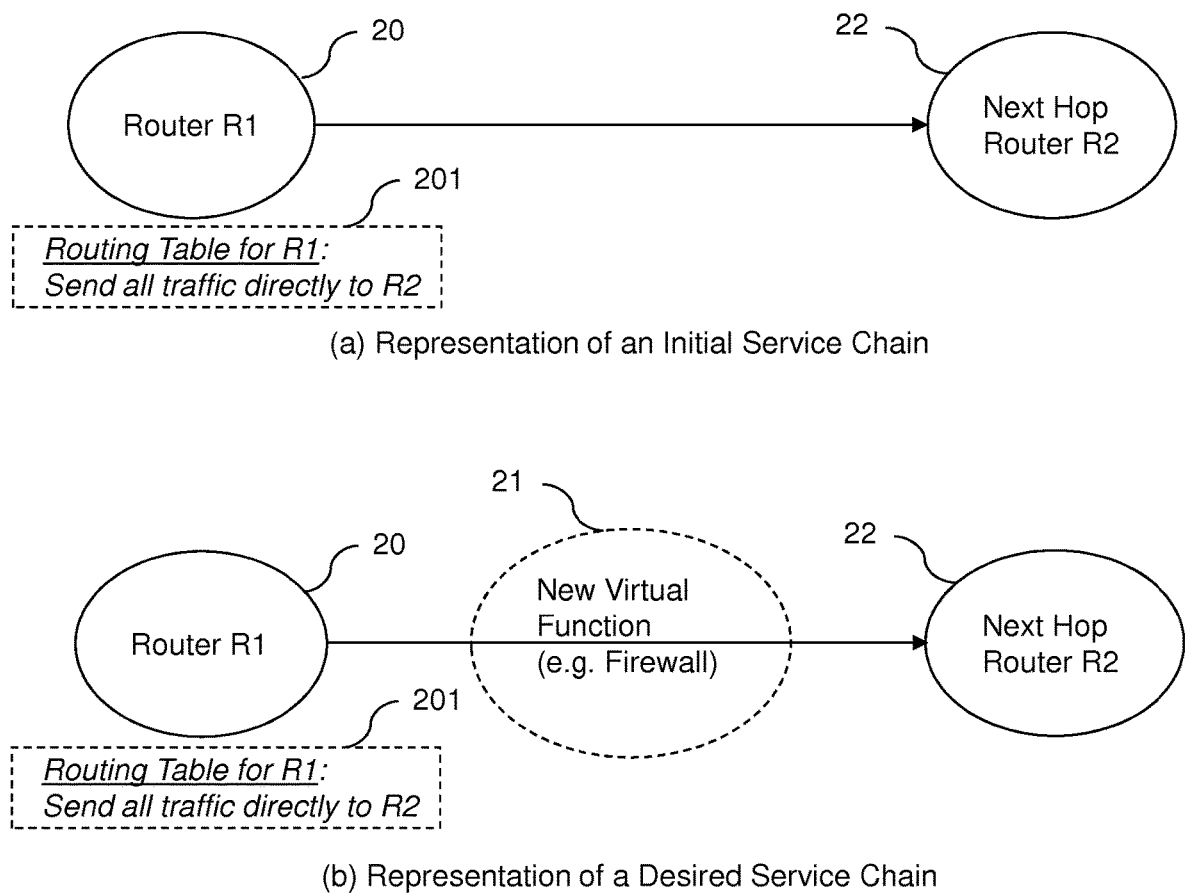
(a) Representation of an Initial Service Chain
(b) Representation of a Desired Service Chain
Figure 2: Addition of a New Virtualised Function

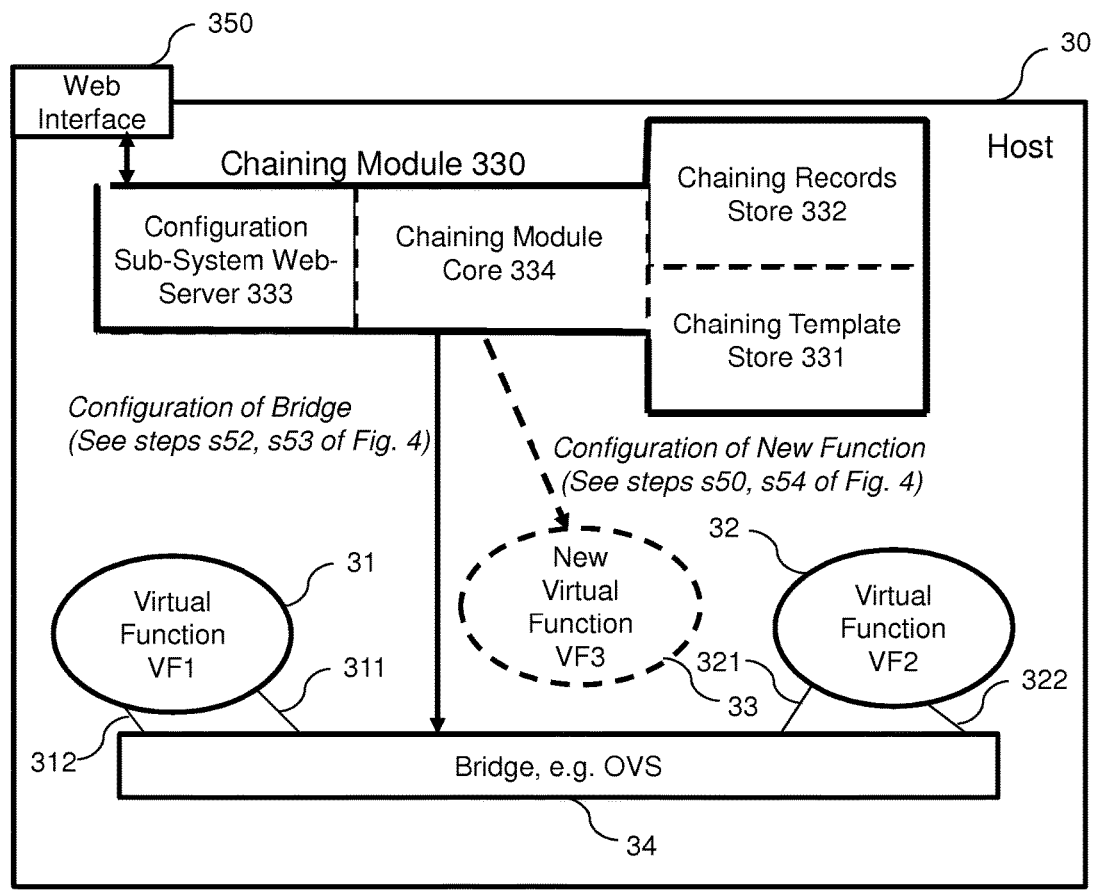
Figure 3: Example Implementation Showing Addition of a New Virtualised Function Between Two Existing Virtual Functions

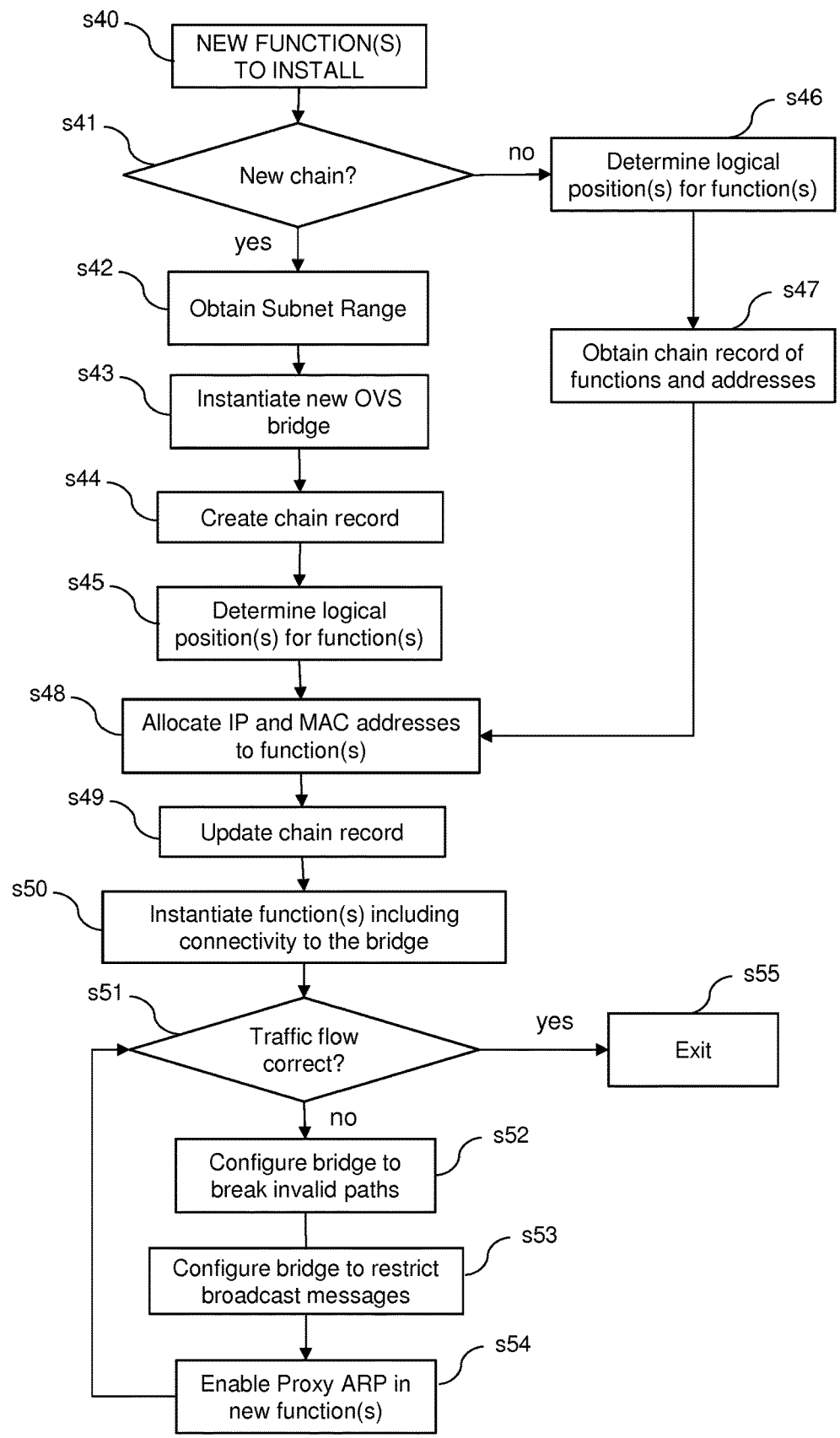
Figure 4: Flowchart of Process to Include/Install a New Virtualised Function

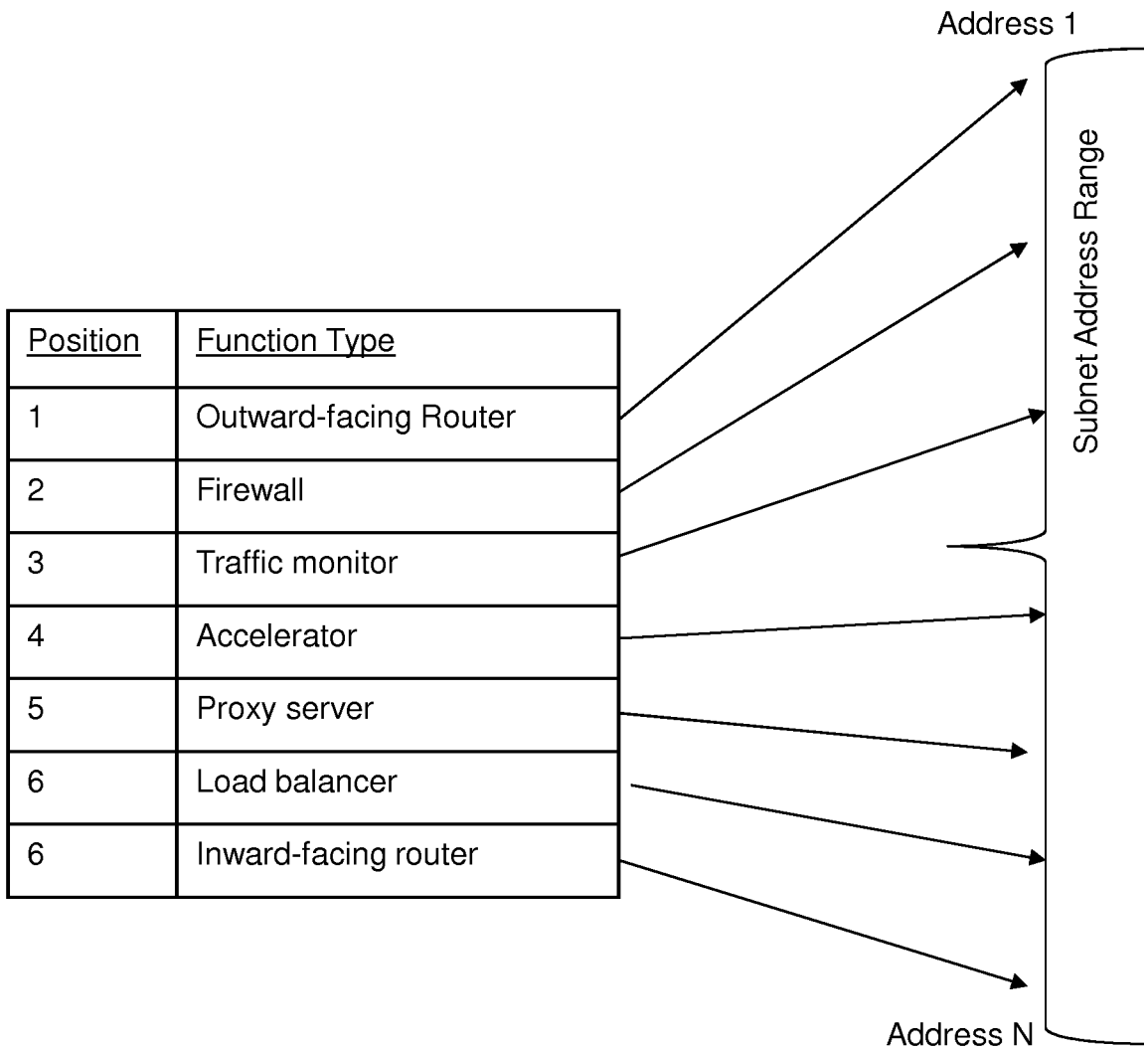
Figure 5: Example Template for a Function Chain Record

| Position | Function | Instantiated? | IP address 1 | MAC Address 1 | IP address 2 | Mac Address 2 | Name |
|---|---|---|---|---|---|---|---|
| 1 | Outward-facing Router | Yes | $n+1$ | M:1 | - | - | |
| 2 | Firewall | Yes | $\text{Round}(\frac{N-1}{6} \times 2)$ | 45:54:::01 | IPaddress1+1 | 45:54:::02 | Riverbed |
| 3 | Traffic monitor | No | | | | | |
| 4 | Accelerator | No | | | | | |
| 5 | Proxy server | No | | | | | |
| 6 | Load balancer | No | | | | | |
| 6 | Inward-facing router | Yes | $N-1$ | M:3 | - | - | |
| - | Bridge | Yes | | | | | ovsBr0 |

Figure 6: Possible Function Chain Record

IMPLEMENTING SERVICE FUNCTION CHAINS

This application is the U.S. national phase of International Application No. PCT/EP2017/082111 filed 8 Dec. 2017, which designated the U.S. and claims priority to EP Patent Application No. 16203319.5 filed 9 Dec. 2016, the entire contents of each of which are hereby incorporated by reference.

TECHNICAL FIELD

The present invention relates to methods and apparatus for implementing service function chains comprising one or more virtualised service functions on one or more computer processors, and in particular to methods and apparatus for including new virtualised service functions in service function chains.

BACKGROUND TO THE INVENTION AND PRIOR ART

Traditionally, different network functions were generally provided as individual pieces of equipment (hardware) each with their own individual interfaces. Software installed on the hardware controls the hardware including all of its network interfaces. Examples of such network functions are firewalls, routers and performance monitoring equipment. These functions are typically provided in a chain that data traffic traverses before reaching its end destination. Today, such functions can be provided as software functions that can co-exist on commodity hardware. This can reduce costs, and can also speed up service provision as there is no need for a technician to visit a site to install bespoke hardware. This trend is known as Network Function Virtualisation or NFV.

The hardware operating the network functions may also operate functions independent of the virtual network functions, such as mail or web servers, IoT ("Internet of Things") gateways, etc. it is also possible to make virtual (software) versions of other lower level devices such as switches or bridges. One example of such a software-implemented bridge is the OpenVSwitch (OVS) (also referred to as "Open vSwitch"), which has a versatile Application Programming Interface (API) allowing fine control of the Layer 2 datapaths.

The functions to be virtualised are most typically instantiated with some degree of isolation between them. Thus they may be within virtual machines (VMs), in which the software representation makes the function operate as if it were a physically separate item. Lighter weight virtualisation techniques, such as "containers" (isolated network namespaces with associated security features such as control groups) or unikernels may also be used. The commonality is that the host software and other virtualised items have limited visibility of the virtualised item, and that the virtualised items have limited visibility of the host.

Data traffic is sent between network functions (be they hardware or software-implemented) by connecting the functions together using typically Layer 2 or Layer 3 communication technology. Layer 2 communications protocols, such as Ethernet, typically operate over a limited geographic, technological or administrative scope. All devices (or network functions) within a local Layer 2 network will be able to reach each other without needing data to be routed. This means that all devices within a local network are either directly wired to each other or all have access to the same shared transmission or broadcast media (e.g. WiFi, an Ethernet bridge or a "bus"). All nodes on the shared media have an address on that shared media—e.g. an Ethernet address (also called a "Media Access Control" or "MAC" address) in addition to the IP address. For simplicity, we will generally consider the Ethernet scenario in the following discussion.

By connecting these individual local networks (known as subnets) together with routers, the network known as the Internet is formed, communication across which involves routing, and use of Layer 3 network technology. Subnets generally reflect technological, organisational or administrative boundaries. At least one router and appropriate Layer 3 communications protocols are needed to connect an Ethernet network to an MPLS (i.e. Multiprotocol Label Switching) network, or to connect a home network to a service provider network.

Routers connect the different networks together, by building routing tables that indicate the next hop towards the destination. The Border Gateway Protocol (BGP) is a common protocol for building such routing tables.

Assuming that data required to be transmitted is formatted as IP data, to send a data packet, the sending node first checks whether the destination IP address belongs to its own local network (its "subnet") or not. If the destination is on the same subnet, it can be reached directly. If the destination is not on the same subnet, it is assumed that it belongs to another (local) network, and the packet needs to be sent to a router acting on behalf of the sending node's local network. The router exists at a predetermined "next hop" IP address, and is on the same subnet as the (sending) node, as well as on one or more other subnets (i.e. it has ports for communicating with each of those subnets). Using the example of an Ethernet network, an Address Resolution Protocol (ARP) message is typically broadcast to all nodes in the (local) Layer 2 network asking which Ethernet Address is associated with "IP address N", where "IP address N" is ether the destination IP address or the next-hop router IP address. The communication is formatted as an Ethernet Packet, containing the sending node's Ethernet (or MAC) address as the source address and using a special "broadcast" address as the destination address. The node with the IP address in question replies directly to the source Ethernet Address that it holds the IP address which is the subject of the request. This ARP mapping is cached for a short while to allow routing of future packets. The node then takes the IP packet and formats it as an Ethernet packet with its Ethernet Address as the source MAC address and the destination Ethernet address as the destination MAC address. The data is then transmitted over the physical link and it will then generally be received by the correct host.

Although ARP broadcast is typically used to discover hosts, all systems will note the MAC and IP addresses of any incoming packet and update the ARP cache accordingly. This means that ARP confusion may occur if two devices holding the same IP address were both to communicate with the same node.

The communicating system has to be aware of whether the target IP address is on its own network or is one that needs to be reached by a router. It is therefore necessary for the node to be aware of whether the IP address belongs to its network or not. In the case of IPv4, all devices in a network have a 32-bit IP address that is made up of two parts: a network part and a host part, which may be indicated using "subnet mask". The IP address as a whole is generally represented as four octets of binary digits, the individual octets being conventionally rendered as their decimal equivalents (each being in the range 0 to 255). In the fourth octet, the values 0 and 255 (i.e. "all-zeroes" and "all-ones" in their binary representations) are reserved for the network address and broadcast address. The subnet mask indicates how many of the binary digits (bits) of the 32-bit address relate to the identity of the (local) network or subnet, with the remainder relating to the specific host identity within that network. Thus, for a machine with an IP address configured as 192.168.0.1/24, the IP address is 192.168.0.1 and its subnet mask is 24. Thus the network part is the first 24 bits (three octets) of the address 192.168.0, and machines in the network can have addresses from 192.168.0.1 to 192.168.0.254. (NB Addresses 192.168.0.0 and 192.168.0.255 are omitted for the reason set out above). Bigger physical (local) networks will therefore have smaller subnet masks, because less of the address space is used to indicate the (local) network and more is used to indicate the specific hosts within that network.

While IPv4 is the most common IP version in use today, the situation is similar with IPv6. An IPv6 address works similarly but is longer and has a different representation (as it is longer).

When a system (which may be a local network, an individual node or another such host) is initially configured, it is given its IP address, its subnet mask and the IP address of the "next hop" router to use in order to reach non-local networks.

Referring to prior disclosures and techniques, background information about the technique of Proxy ARP can be found in the following Internet Engineering Task Force (IETF) Request for Comments (RFC) document, IETF RFC 1027: "Using ARP to Implement Transparent Subnet Gateways" by Carl-Mitchell & Quarterman (October 1987), which is available from: http://www.ietf.org/rfc/rfc1027.txt. "Open-Flow" is a standard communications interface defined between the control layer and the forwarding layer of a Software-Defined Networking (SDN) architecture. Open-Flow allows direct access to and manipulation of the forwarding plane of network devices such as switches and routers, both physical and virtual (hypervisor-based), and allows the flow of packets across a network of switches to be controlled. Further information about OpenFlow and OpenVSwitches (referred to earlier) is available from the Open Network Foundation, for example: https://www.opennetworking.org/sdn-resources/openflow, and from Linux MAN pages for OVS-OFCTL available from many places, for example: http://manpages.ubuntu.com/manpages/trusty/man8/ovs-ofctl.8.html US2016205018 ("LI/Futurewei") relates to hardware and software methodologies for creating and managing portable service function chains in a computer network. In particular it describes a self-contained service function network layer between a chain (e.g. a logical chain or service function chain) and a substrate network, and describes techniques for constructing logical chains for service function networks using chain tables, organising chain tables using APIs, deploying service function networks to substrate networks, routing packets through a service function network and a substrate network, and inserting, deleting, re-routing, moving and substituting service functions in logical chains.

EP3035607 ("Tieto Oyj") relates to service chain management, and in particular to a technique aiming to allow service chains to be changed without causing long delays to their operation by configuring the application implementing the service in the chain and then changing the output identifier of the previous application to correspond with the input identifier of the added application.

US2016248858 (Qiu/AT&T) relates to virtualised network function chaining management, and in particular to management of virtualised network functions to alert existing virtualised network functions to instantiation of new virtualised network functions and to changes to existing virtualised network functions.

WO 2015/062627 (Ericsson) relates to control of a chain of services, and in particular to a service control entity configured to control chains of services provided in a service network in which a plurality of service providing modules are provided, wherein data packets of a data packet flow from a source address to a destination address are transmitted through the service network to apply a chain of services to the data packet flow. A chain control unit determines the possible chains of services to be applied to the different data packet flows, and identifies, for each chain of services, the predefined sequence of services applied to the data packet flow and the service providing modules which provide the services contained in the predefined sequence of services, and identifies in which order the identified service providing modules have to be passed in order to apply the predefined sequence of services to the data packet flow. A module control unit controls the service providing modules and assigns, to each of the identified service providing modules contained in the chain of services, an ingress network address of an underlying layer of the end-to-end layer, wherein the module control unit assigns ingress network addresses to the service providing modules used in the corresponding chain of services in such a way that the ingress network address of a service providing module and the ingress network address of a neighbouring service providing module which is the subsequent service providing module in the corresponding chain of services, are related to each other by a predefined relationship.

An Open Networking Foundation ("ONF") Technical Specification document entitled "L4-L7 Service Function Chaining Solution Architecture" (ONF TS-027, Version 1.0, 14 June 2015) by Cathy Zhang et al describes the architecture of layers L4 to L7 service function chaining (SFC), and the information necessary for the SDN controller's northbound interface (NBI) and southbound interface (SBI). The intent is to build a common base for concrete NBI specifications and OpenFlow (OF) extensions needed for SFC.

An IETF Network Working Group Internet Draft document entitled "Ethernet MAC Chaining" by P. Bottorff et al (21 Jul. 2016, draft-fedyk-sfc-mac-chain-02.txt) discusses a service function chaining mechanism called MAC chaining which is built largely on existing Ethernet frame and forwarding capabilities.

US2015333930 (Aysola et al/Akamai) entitled "Dynamic Service Function Chaining" relates to distributed data processing systems, to service platforms for network operators, and to service function chaining.

WO16089400 ("Hewlett Packard") entitled "Modifying an Address to Forward a Packet to a Service Function" discusses identifying a service function chain based on a switch address from a packet.

Referring again to Proxy ARP, discussed earlier, essentially, a host replies in response to an ARP message saying that it has the IP address at its MAC address in order to enable traffic to be directed to itself for further processing. A purpose of this was to enable the splitting of big physical networks into subnets when the hosts were not capable of understanding subnets. A proxy host may respond to an enquiry relating to ownership of an IP address for which it stands proxy in the same way that it would if it actually had the IP address in question. Thus, where a virtualised service function chain is implemented on the host, the host's reply that it has the IP address in question at its MAC address may not be strictly true because the host generally does not own the IP address of which it indicates ownership.

In relation to the implementation of virtualised service function chains, it would be useful to be able to rely on Proxy ARP, but with virtualised functions, the mere use of Proxy ARP would be insufficient on its own for reasons such as the following:

If a bridge is used to connect the service functions, several functions on the virtual network could simultaneously reply to ARP broadcast messages, leading to erratic behaviour, and significant traffic bypassing any new virtual function added to the service function chain after its initial creation and configuration.

If virtual Ethernet software constructs were used to connect the virtualised service functions, these cannot be moved between functions, so new virtual Ethernet pairs would be needed between the new and old functions and all these Ethernet constructs would need to be configured on the original functions as well as on the new functions.

If may appear that OpenFlow could be used to direct packets to a new virtual function without further adaptation, but in this case, the new virtual function would generally reject the packets because it would not recognise the DST_MAC (i.e. Destination MAC) address or the DST_IP (i.e. Destination IP) address.

If simply using an OpenFlow switch, for example, it would be possible to re-write packet headers with the relevant source and destination MAC and IP addresses, but this would involve significant additional packet processing (especially re-writing the DST_IP part), which should be avoided in order to maximise the speed of the data path.

SUMMARY OF THE INVENTION

According to a first aspect of the invention, there is provided a method, performed by a processing module implemented on one or more processors, of configuring one or more processors to implement a service function chain comprising one or more virtualised service functions, the method comprising, in respect of at least one new virtualised service function to be included in a service function chain:

determining a position in the service function chain at which the new virtualised service function is to be included;

in dependence on the position in the service function chain determined in respect of the new virtualised service function, allocating to the new virtualised service function at least one internal address selected from an ordered set of internal addresses assigned to the service function chain, the at least one internal address allocated to the new virtualised service function being an address selected from one or more addresses in the ordered set that is not currently allocated to a service function in the service function chain and being an address to be usable by the switching processor as a source address when forwarding data received from the new virtualised service function and requiring to be processed by one or more other service functions in the service function chain; and providing to the switching processor an indication of the at least one internal address allocated to the new virtualised service function, the switching processor being configured to receive data from one service function in the service function chain and to forward data to another service function in the service function chain in dependence on the one or more internal addresses allocated respectively to the one or more service functions in the service function chain.

By virtue of a configuration method according to a preferred embodiment, a set of virtualised network functions can co-exist on a server (or a set of servers) and be connected together in a particular order so as to provide the required network services.

With preferred embodiments, a new service function can be inserted after the initial creation and configuration of a service chain in such a way as to (a) ensure that no re-configuration is needed in any of the existing functions;

(b) minimise breaks in connectivity during installation/configuration/insertion of new service functions to sub-second timescales (compared to the hour timescales needed today for reconfiguration of a service function chain); and (c) avoid adding excess delay into the data path (by avoidance of "packet mangling", i.e.

modification of information in the IP packet header, for example).

Preferred embodiments use a rules-driven allocation of IP addresses to the service functions, followed by a combination of proxy ARP to implement a form of transparent subnet split with suitably-configured software-implemented switches used to emulate the separate physical networks that are assumed to exist within a normal transparent subnet split scenario.

According to preferred embodiments, the switching processor may be configured to forward data received from one service function in the service function chain to another service function in the service function chain in dependence on one or more internal addresses allocated respectively to the one or more service functions in the service function chain, the allocation of said one or more internal addresses being determined in dependence on a specified order in which data is to be processed by the respective service functions in the service function chain. The allocated addresses may be selected from those available within what is generally referred to as a "subnet". According to such embodiments, the specified order may be determined according to a predetermined template, which may be obtained from a store containing one or more such "chain record" templates. Alternatively, the specified order may be determined in accordance with an instruction received from a user. Also, the specified order may be based on a stored template, but modified based on a user instruction, for example.

According to preferred embodiments, the one or more internal addresses may be selected from a range of available internal addresses having a predetermined order, the range of available internal addresses having a first available internal address and a last available internal address, the one or more selected internal addresses being spaced between said first available internal address, said last available internal address and any other internal addresses already allocated to service functions in the service function chain.

According to preferred embodiments, the method may further comprise ascertaining, after the provision to the switching processor of said indication of said at least one internal address allocated to the new virtualised service function, whether data submitted for processing by the service functions in the service function chain will be forwarded to each of the service functions in the service function chain in accordance with the specified order.

According to such embodiments, the method may further comprise re-configuring the switching processor if it is ascertained that data submitted for processing by the service functions in the service function chain will not be forwarded to each of the service functions in the service function chain in accordance with the specified order, the reconfiguration being such that data submitted for processing by the service functions in the service function chain is forwarded to each of the service functions in the service function chain in accordance with the specified order.

According to preferred embodiments, the method may comprise implementing a new service function chain comprising said at least one new virtualised service function.

Alternatively, the method may comprise including the at least one new virtualised service function in a previously-implemented service function chain comprising one or more virtualised service functions.

According to preferred embodiments, the at least one internal address allocated to the new virtualised service function to be included in the service function chain, any internal addresses previously allocated to virtualised service functions already included in a service function chain, and any internal addresses assigned to the service function chain not currently allocated to a service function in the service function chain together form an ordered and sequential set of internal addresses assigned to the service function chain.

According to preferred embodiments, the processing module may comprise and/or have access to one or more data stores. Such data stores may comprise one or more stored "chain record" templates for use in creating new service function chains, and/or one or more stored "chain records" relating to already-created service function chains, for example.

According to preferred embodiments, the processing module may be configured to provide instructions to the switching processor relating to a new service function chain required to be created or relating to an existing service function chain required to be updated by the inclusion and/or removal of one or more service functions. It may also be configured to receive information from the switching processor and other entities.

According to preferred embodiments, the processing module may be configured to interact with a user interface in order to receive instructions relating to virtualised service functions to be included in and/or removed from service function chains.

According to a second aspect of the invention, there is provided apparatus for configuring one or more processors to implement a service function chain comprising one or more virtualised service functions, the apparatus comprising one or more processors operable to perform a method according to the first aspect in respect of at least one new virtualised service function to be included in a service function chain.

According to a third aspect of the invention, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second and third aspects.

Currently a customer or other user could experience service downtime of over an hour whilst a virtual network function is being added to their network configuration. For many users, this loss of connectivity would be very disruptive and is experienced as a cost.

The ability to add new virtualised network functions with minimal network disruption is highly advantageous in relation to the provision of virtualised services, as it allows new virtualised functions to be added to a network while minimising or decreasing the amount of disruption experienced by users or customers.

Preferred embodiments may be used to allow service providers to offer new options to their customers. Customers could be offered short-term use of additional virtualised service functions (in a "try-before-you-buy" basis, or for a temporary service uplift, for example) without having to experience the disruption that would normally be expected. Further, making it quick and easy to add and remove service functions may also make network upgrades safer by making it easy to "rollback" a solution if a problem is subsequently detected.

BRIEF DESCRIPTION OF THE DRAWINGS

A preferred embodiment of the present invention will now be described with reference to the appended drawings, in which:

FIG. 1 is a block diagram of a computer system suitable for the operation of embodiments of the present invention;

FIG. 2 is a figure symbolising the addition of a new virtualised function to an existing service function chain;

FIG. 3 illustrates functional entities involved in an implementation in which a new virtualised function is added between two existing virtual functions;

FIG. 4 is a flowchart illustrating a method according to a preferred embodiment for installing a new or additional virtualised function in a newly-created or an existing service function chain;

FIG. 5 illustrates an example template that may be used for creating a new function chain record; and FIG. 6 illustrates an example of a Function Chain Record.

DESCRIPTION OF PREFERRED
EMBODIMENTS OF THE INVENTION

With reference to the accompanying figures, methods and apparatus according to a preferred embodiment will be described.

FIG. 1 is a block diagram of a computer system 10 suitable for operating embodiments of the invention. A central processor unit (CPU) 102 is communicatively connected to a data store 104 and an input/output (I/O) interface 106 via a data bus 108. The data store 104 can be any read/write storage device or combination of devices such as a random access memory (RAM) or a non-volatile storage device, and can be used for storing executable and/or non-executable data. Examples of non-volatile storage devices include disk or tape storage devices. The I/O interface 106 is an interface to devices for the input or output of data, or for both input and output of data. Examples of I/O devices connectable to I/O interface 106 include a keyboard, a mouse, a display (such as a monitor) and a network connection.

A method according to a preferred embodiment will be described in relation to a simple scenario, in which it is desired to add a new virtual function between two virtual functions in an existing service chain, but it will be appreciated that embodiments of the method may be applicable to scenarios in which it is desired to add a new virtualised function in a local network between two existing physical elements, in such a way as to allow for the later addition of further virtualised functions, for example.

The new virtual function (and/or other or subsequently added functions) may be implemented on new hardware. It will be apparent that adding a single virtual function on new hardware is similar in some ways to adding a new physical device, but adding the new virtualised function according to preferred embodiments may be advantageous in that it can be done in such a way as to facilitate the subsequent addition of further virtualised functions in a quick, efficient manner.

The virtualised function(s) may be implemented on the hardware of one of the existing physical elements. Currently, some routers include a separate computer board inside the physical router box (i.e. a routing board and a compute board) suitable for this.

It will also be appreciated that a new virtualised function to be added need not be inserted between two existing elements, or virtualised functions in a service chain. The new virtualised function may in fact be inserted at the start or end of an existing service chain.

FIG. 2 illustrates the concept of service function chaining, where a new virtual function 21 (a firewall, for example), needs to be added between two existing virtual functions, which in this example are Routers R1, 20 and R2, 22. As well as routers and firewalls, other possible service functions which may be virtualised include other security functions, performance monitoring functions, data inspection functions, optimisation functions, caching functions, data processing functions, session management functions, functions specific to mobile networks, etc.

The upper representation in FIG. 2 (marked as "Representation (a)") represents an initial service chain having two such virtual functions (in this case, routers R1, 20 and R2, 22).

The lower representation in FIG. 2 (marked as "Representation (b)") represents a desired service chain in which a new virtual function (in this case, firewall 21) is included between the two existing virtual functions (the two routers) of the initial service chain.

When (virtual) routers are instantiated they are configured such that they know to communicate with each other, or at least with their respective "next hop" router(s) if these are not each other. For the purposes of this figure, the simple situation in which Router R1, 20 is configured to forward any traffic it receives to Router R2, 22 will be considered (so ignoring what Router R2, 22 is configured to do with data it receives). Router R1, 20 therefore has a simple routing table 201 setting out the rule "Send all traffic directly to R2". (It will be appreciated that Router R2, 22 would generally also have a routing table, and that rules in each routing table may be more complex than this simple rule.)

When the new virtual function 21 is added in, it is desirable that neither of the routers needs to be reconfigured (e.g. by having its routing table updated), particularly because this can lead to long service outages. It will be understood that it would be possible to achieve this using address translation (e.g. re-writing IP addresses in packets to that of the new function), but this generally slows down the data path, so it is desirable not to use or rely on this technique. (Note that the term "address translation" is used here, rather than "Network Address Translation" or "NAT". This is because such terms are generally taken to refer specifically to Layer 3/Layer 4 address translation, whereas in the present context, the term "address translation" may also refer to Layer 2/Layer 3 address translations, for example.

The method outlined below allows one or more new virtual functions to be inserted in a service chain whilst avoiding problems such as those set out earlier. It is described below with reference primarily to FIGS. 3 to 6.

Referring to FIG. 3, this illustrates the functional entities in a host processor involved in an example implementation in which a new virtualised function is added between two existing virtual functions.

In FIG. 3, a Host 30 is shown, which may be a computer processor in or acting as a network element such as an actual router, for example, or which may be a separate element acting as a local network controller, for example. In this example, Host 30 already has two virtual functions VF1, 31 and VF2, 32 instantiated thereon, which may be virtual routing modules or other types of functional modules. These are functionally linked by a switching processor or bridge function 34, in this example in the form of an OpenVSwitch (OVS). A new virtual function VF3, 33 is shown, which in this example is desired to be included between the existing virtual functions VF1, 31 and VF2, 32.

It will be understood that in other scenarios, there need not initially be any virtual functions instantiated on Host 30—the new virtual function to be instantiated may be the first virtual function in what is to be a new service chain. In such cases, the bridge 34 need not be instantiated until it is desired to create the new service chain.

Also on Host 30 in FIG. 3 is a Chaining Module 330. This is a functional module which manages any service chains on Host 30. In the example of FIG. 3, the sub-functions of the Chaining Module 330 (in this case a Configuration Sub-System Web-Server 333, a Chaining Module Core 334, a Chaining Template Store 331 and a Chaining Records Store 332, to be explained later) are shown co-located within the Chaining Module 330, but there is in fact no requirement for co-location of any or all of the sub-functions of the Chaining Module 330—one or more of them may be located remotely. Further there is no requirement that all virtual functions of the service chain are co-located on the same host—as will be understood from the explanation that follows, in which the virtual functions are co-located on the same host and a bridge within that host is therefore used, if the virtual functions are not co-located on the same host, the bridge within the host could be replaced by a bridge configured to work across multiple hosts.

Referring to FIG. 4, this is a flowchart illustrating a method according to a preferred embodiment for installing new or additional virtualised functions in a newly-created or an existing service function chain. This will be explained with reference to the example where a service function chain is initially created with two virtual functions such as VF1, 31 and VF2, 32 in FIG. 3, which in this instance are routers, and where it is subsequently required to install a new virtual function VF3, 33 (a new virtual firewall, for example) between the two existing virtual functions VF1, 31 and VF2, 32. It will be appreciated that the first two virtual functions VF1, 31 and VF2, 32 need not be added concurrently—one may be installed according to the process shown in the flowchart, then the other—but in the interests of brevity, the example described will involve them being installed concurrently, with additional virtual function VF3, 33 being installed subsequently.

Starting from step s40, when a service function chain is initially created, the new function(s) to install will be the first function(s) in the chain (in terms of time of installation at least—not necessarily in terms of position(s) in the chain).

At step s41, the Chaining Module Core 334 checks the Chaining Records Store 332 to see if a Chain Record already exists or if the new virtual function(s) is/are to be the first virtual function(s) in a new service chain.

Where there is to be a new service chain, the process proceeds via step s42 and onward via the steps in the main vertical column on the left-hand side of the flowchart. Where a new virtual function is to be included in an already existing service chain, the process proceeds via step s46 and s47 on the right-hand side of the flowchart, as will be described later.

In this instance, a new service chain is to be created, so the process proceeds via step s42. At step s42, a subnet range is obtained. The determination of the subnet range could be made by an entity external to the host 30 or other such management system that is configuring the functions. Typically there are processes to ensure that the subnet allocated is unique within the scope of operation (which could even be the whole Internet). For a new chain, the subnet range could be part of the Service Function Chain configuration information entered for example from a web interface 350 to the Chaining Module 330, via the Configuration Sub-System Web Server 333. Other elements of the configuration may indicate for example which virtual functions are required, geographic location etc. This is generally performed in response to or with reference to information provided by a particular customer setting out the service or services desired by the customer, i.e. it is generally part of the configuration information associated with the new chain along with the types of function that are needed. At some level, this could be automated. Auto-detection of the required subnet range or the nature of an existing function chain could be used; conceptually, however, external allocation and maintaining a chain record is generally the simplest approach.

At step s43, a new Bridge 34 (i.e. a functional bridge, in this case using an OpenVSwitch (OVS)) is created/instantiated.

The reasons for creating the bridge will be appreciated more fully later, once the addition of one or more further virtual functions to an existing service chain is explained, but it will be understood that a bridge is used to allow virtual functions to be added (or removed) from a bridge without impacting other virtual functions. If virtual functions were being "chained" in the physical world, Ethernet cables connecting the devices could be moved and any processes inside the devices would be "unaware"; current software means that virtual Ethernet links cannot be moved, however. Also, it will be appreciated that it is possible to configure private subnets on a pre-existing OVS—i.e. an existing OVS can be re-used to create what would appear as a logically new OVS providing connectivity to a subnet, even if it is re-using an existing software instantiation.

Returning to the flowchart of FIG. 4, a chain record for the new service chain is then created (step s44). The chain record could be based upon a chaining template, an example of which is shown in FIG. 5, which may be stored in a Chaining Template Store 331 in the Chaining Module 330 of FIG. 3. The function chain record template should be consistent with the subnet range. Auto-detection of the chain to dynamically build a chain record is also possible, however.

FIG. 6 shows an example of a chain record (although it should be noted that not all elements would be populated at this stage of the process). Leaving aside the entry for the "Firewall" at this stage, the chain record has entries for an outward-facing router (which is at Position 1 in the chain, according to the template of FIG. 5), an inward-facing router (which is at Position 6 in the chain, according to the template of FIG. 5), and a bridge. The routers each have one IP address and one MAC address in the chain record.

In the Chain Record as shown in FIG. 6, the MAC addresses of the interfaces of the outward-facing router and the inward-facing router that are internal to the service chain are referred to respectively as M:1 and M:3—this is simply notational shorthand, the numbers 1 and 3 being used simply to indicate that the respective MAC addresses are different.

The IP host address range available is n to N, where "n" is the lowest available address and "N" is the highest available address. In the present case, n is zero, but in other cases, n might not be zero. It depends on the network address allocation range. With test networks, for example, the network generally starts at n=1 and runs to N=254, for reasons of simplicity, but different boundaries are possible. In the present example, the IP host address range would be 0 to N. As explained previously, however, addresses 0 and N are reserved addresses, as per normal (they are reserved to be the network identity and IP broadcast addresses), so the available address range is from n+1 to N−1.

In this scenario, the IP address to assign to a new virtual function to be included in the service chain would be given by the following:

$$\frac{(N-n)}{(\text{Max no. of functions envisaged in chain})} \times \text{Position in chain}$$

The result should generally be rounded to the nearest integer.

Returning to the flowchart of FIG. 4, at step s45, a logical position is determined for the (or each) new function. The new chain record and/or an appropriate chaining template may be used to determine a logical virtual function position in the new service chain for the/each new virtual function.

It will be appreciated that any given subnet has a maximum number of places for functions based on the size of the subnet range. For example, a /30 subnet can only have two functions, which may be a public-facing and a private-facing router, for example, whereas a /24 subnet could have up to 254 functions.

For this process to work automatically, the system generally needs to receive or already have instructions as to where (in a service function chain) functions should be placed (based on the order in which the data should be processed through the chain). Routers should be at opposite ends of a subnet, for example. A service function chain is essentially an ordered sequence of functions or functional modules that data must pass through.

The number of possible functions in a chain might be large, so one way to ensure that functions are added in the correct place in the chain is to have a set of rules encoded into the system that it can follow.

In this example, an ordered list of possible generic (see FIG. 5) or specific network functions is used as the template for the chain record. Different templates may exist, for different types of customer or for different sizes of subnet, for example. The template shown in FIG. 5 is suitable for creation of a function chain record for a subnet with six or more available IP addresses, and may be used for determining function location and IP address allocation in respect of a service chain based thereon.

At step s46, one or more IP addresses and MAC addresses is/are allocated to the/each new function (i.e. generally at least one of each type of address as an input address for data from another function and at least one of each type of address as an output address for data being forwarded to another function).

At step s49, the address allocations are recorded in the chain record, as shown in FIGS. 5 and 6, for example. (Note that while MAC addresses simply need to be unique, knowledge of the specific MAC addresses used is generally needed for the bridge configuration.)

As indicated earlier, FIGS. 5 and 6 indicate how the IP addresses may be allocated. Note that spacing IP addresses in this way, while optional, is preferable because it allows for service chain growth by leaving a logical space for further new functions to be inserted later.

It will be appreciated that by fully using the available subnet, the present technique allows for totally new functions and/or function types to be identified after the creation of the initial chain, allowing for expansion of the service chain beyond the initial function types. If necessary, however, a new function could be inserted at position 1.5, for example.

At step s50, the currently-installed function(s) is (or are) instantiated with connectivity to the bridge 34.

The currently-installed functions (in this example, virtual functions VF1, 31 and VF2, 32) are then able to communicate with each other via bridge 34. Bridge 34 is used as the virtual functions should share a common network that is not disrupted when a new virtual function is being added to prevent communications disruptions and problems during the addition of new functions. It should also be possible for the broadcast network to be adjustable into logically-separate zones. Specifically, the ability to restrict data flow between specific pairs of virtual functions is desired, as is the ability to direct broadcast messages to a subset of the available virtual functions. Using an OpenVSwitch (OVS) is a preferred way to achieve this—an OVS has a well-featured programming interface. It will be noted that Virtual Functions VF1, 31 and VF2, 32 in FIG. 3 may each have multiple connections to the Bridge 34. Those between Bridge 34 and Virtual Function VF1, 31 are shown as connections 311 and 312. Those between Bridge 34 and Virtual Function VF2, 32 are shown as connections 321 and 322.

In the case of a newly-created service chain, it will generally be found at step s51 that traffic flows are correct at this stage, so the procedure may end at step s55 and the system then awaits an indication that one or more other functions are required to be installed. Steps s52, s53 and s54, which relate to the situation where it is found at step s51 that traffic flows are not correct, will be described later, as part of the following explanation of the procedure when an additional function (in this example virtual function VF3, 33) is required to be included in the existing chain.

Returning to the beginning (step s40) of the flowchart of FIG. 4, if at step s41 a new function is to be included in an existing service chain (i.e. meaning that a new chain is not required to be created), steps corresponding to steps s42, s43 and s44 clearly do not need to be performed. A step s46 (corresponding to step s45) of determining the logical function position is performed in respect of the new function. The chain record of functions and addresses for the existing chain may then be obtained (step s47), then the process proceeds to step s48, with IP and MAC addresses being allocated to the new function.

As before, the address allocations (now including those for the new function) are recorded in the chain record at step s49. In the present example, it will be noted that the chain record entry for the new virtual function, in this case a virtual firewall, includes two IP addresses and two MAC addresses. This is because its position in the service chain is to be between two existing service functions. A first pair of addresses (one of each type) allows the new virtual function to be addressed for receipt of data previously processed by the virtual function preceding it in the service chain (in this case, the outward-facing router). A second pair of addresses allows data resulting from processing by the new virtual function to indicate that it has resulted from processing by the new virtual function, thereby allowing it to be processed next by virtual function following it in the service chain (in this case, the inward-facing router).

It will be noted that there is an entry for the Firewall in the final column of the Chain Record shown in FIG. 6, headed "name". This allows for a more specific name relating to the function instance to be used when referring to it. This may be of use where there are multiple firewalls on a system, for example. This could occur where there are multiple protection zones within a single service chain (i.e. a first firewall may protect a Web Server for example, while a second firewall may provide much stricter protection to a finance system), or because multiple service chains exist within the same system. In such cases, the names of the respective functions (e.g. the respective firewalls) should be unique to the system (e.g. the hardware platform) so that the two functions (e.g. firewalls) can have different configurations.

The names shown in FIG. 6 are in human-readable form. A user would generally be able to provide a name when setting up such a function, but the system would generally be able to allocate a default name if required. In either case, the name may be used by the system. To configure the bridge, the system generally needs to identify the bridge it is configuring in order to be able to apply the command to the appropriate bridge.

At step s50, the new virtual function (i.e. function VF3, 33) is now fully instantiated and connected to the Bridge 34. The new function can be fully programmed in-situ with correct virtual interfaces without interfering with existing traffic. (Note that programming in situ generally simplifies configuration. For example, most Linux machines will test that the proposed next hop is reachable before allowing configuration of the next hop.)

This time, it may be found at step s51 that traffic flows are now incorrect due to the inclusion of the additional function VF3, 33 in the service chain. To identify whether this is the case, a standard traceroute program could be run automatically for example, to verify that data traverses every element in the chain, in order to verify (referring to FIG. 6, for example) that IP addresses 1, $$\text{Round}\left(\frac{N-1}{6}\times 2\right)$$

and n as listed in the "IP address 1" field of the chain record are reported back by traceroute.

Whatever technique is used to determine whether or not the traffic flow following the installation of a new function is correct, if it is found at step s51 that traffic flows are still correct even with the inclusion of the new function, the procedure may end at step s55, and the system may then await an indication that one or more other functions are required to be installed (or removed). If however it is found at step s51 that the traffic flow is now incorrect, as would typically be the case where a new function has been added to a pre-existing chain, with data bypassing the new function, for example, a further procedure involving steps s52, s53 and s54 is then performed one or more times until traffic does flow correctly.

To illustrate this, the example where a firewall is added in the chain as in FIGS. 2 and 3 will again be considered.

If it has been found at step s51 that the traffic flow is incorrect, the Chaining Module 330 first breaks any existing links between the existing adjacent virtual functions (which in this example are the existing virtual functions VF1, 31 and VF2, 32 of FIG. 3, which themselves may be the Routers R1, 10 and R2, 12 in FIG. 2) between which it is desired to include the new virtual function (which in this example is the new virtual function VF3, 33, which itself may be the Firewall 11 in FIG. 2). This involves configuring the bridge 34 in order to break any paths that are now deemed invalid (step s52).

In the case where the bridge 34 is an OVS bridge, when any packets arrive at the OVS bridge, its rules database is consulted to determine what processing may be required. The rules database can be configured to specify that packets between a specific source and destination MAC address pair must always be dropped.

The bridge 34 is then configured to prevent the existing adjacent virtual functions (i.e. virtual functions VF1, 31 and VF2, 32 of FIG. 3) from exchanging broadcast messages (step s53).

In this example, the destination address is the broadcast address. The packets in question should go to some but not all destinations. Again, the OVS bridge can be configured to specify this behaviour as a set of rules in its rules database.

At step s54, Proxy ARP is enabled in the new virtual function (i.e. virtual function VF3, 33). The precise manner in which this is achieved will depend on the operating system being used, but generally involves the Chaining Module 330 setting a flag or other such indicator in respect of the virtual function in question.

Where the operating system being used is Linux, for example, and where the virtual functions in the service chain are instantiated within a virtual machine (VM) built within the Linux system, Proxy ARP is an option or capability that exists within the Linux system that can be turned on or off by the chaining module as required. In such cases, enabling Proxy ARP in the new virtual function typically involves the appropriate proxy_arp system flag being set to 1, i.e. setting a /proc/sys/net/ipv4/conf/ethx/proxy_arp value to 1 (where "ethx" is the interface bound to the IP_address 1 in the new function).

By using Proxy ARP, it can be ensured that no other service functions devices in the network chain need to be "aware" that anything has changed, or need to be reconfigured themselves. In particular, they do not need to have a new "next hop IP address" configured, for example.

Once Proxy ARP has been enabled in the new virtual function (step s54), a further check is made as to whether the traffic flow is now correct (step s51), as should now be the case. If so, the installation procedure may end at step s55, as described previously. If not, steps s52, s53, s54 and s51 may be repeated until it is found that the traffic flow is correct.

The steps of the exemplary method described involve (at least primarily) configurations on the Bridge 34 and the new virtual function 33, which can generally be performed in sub-second timescales. Service disruption can thus be restricted to sub-second timescales.

The above steps can be performed without requiring operations to be performed on existing service functions. Service disruption can therefore be avoided.

Normal switching and routing may be used to direct the traffic. No "packet mangling" (e.g. changing of IP addresses by the switch or a NAT function) is required, thereby ensuring that the data path remains fast and efficient.

The method described above could be implemented partly or completely on or by a host processor itself, by a chaining module such as that shown in FIG. 3 as described above, for example. Alternatively, a corresponding method could be implemented partly or completely on or by a remote or virtual network management system, which may be a computer or a suite of a computers with linked processes, for example.

Insofar as embodiments of the invention described are implementable at least in part using a software-controlled programmable processing device such as a microprocessor, a digital signal processor or another processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method, performed by a processing module implemented on one or more processors, of configuring one or more processors to implement a service function chain comprising one or more virtualised service functions, the method comprising, in respect of at least one new type of virtualised service function to be inserted between service functions within a pre-existing service function chain:

determining a position within the pre-existing service function chain at which the new virtualised service function type is to be inserted;

in dependence on the position within the service function chain determined in respect of the new virtualised service function type, allocating to the new virtualised service function type at least one internal address selected from an ordered set of internal addresses assigned to the service function chain, the at least one internal address allocated to the new virtualised service function type being an address selected from one or more addresses in the ordered set that is not currently allocated to a service function in the service function chain and being an address to be usable by a switching processor as either a destination address or a source address, or both, when forwarding data between one or more other service functions in the service function chain and the new virtualised service function type; and providing to the switching processor an indication of the at least one internal address allocated to the new virtualised service function type, the switching processor being configured to receive data from one service function in the service function chain and to forward data to another service function in the service function chain in dependence on the one or more internal addresses allocated respectively to the one or more service functions in the service function chain.

2. The method according to claim 1 wherein the switching processor is configured to forward data received from one service function in the service function chain to another service function in the service function chain in dependence on one or more internal addresses allocated respectively to the one or more service functions in the service function chain, the allocation of said one or more internal addresses being determined in dependence on a specified order in which data is to be processed by the respective service functions in the service function chain.

3. The method according to claim 2 wherein said specified order is determined according to a predetermined template.

4. The method according to claim 2 wherein said specified order is determined in accordance with an instruction received from a user.

5. The method according to claim 2 wherein said one or more internal addresses are selected from a range of available internal addresses having a predetermined order, the range of available internal addresses having a first available internal address and a last available internal address, the one or more selected internal addresses being spaced between said first available internal address, said last available internal address and any other internal addresses already allocated to service functions in the service function chain.

6. The method according to claim 2 wherein the method further comprises ascertaining, after the provision to the switching processor of said indication of said at least one internal address allocated to the new virtualised service function type, whether data submitted for processing by the service functions in the service function chain will be forwarded to each of the service functions in the service function chain in accordance with the specified order.

7. The method according to claim 6 wherein the method further comprises re-configuring the switching processor if it is ascertained that data submitted for processing by the service functions in the service function chain will not be forwarded to each of the service functions in the service function chain in accordance with the specified order, the reconfiguration being such that data submitted for processing by the service functions in the service function chain is forwarded to each of the service functions in the service function chain in accordance with the specified order.

8. The method according to claim 1 wherein the method comprises implementing a new service function chain comprising said at least one new virtualised service function type.

9. The method according to claim 1 wherein the method comprises including said at least one new virtualised service function type in a previously-implemented service function chain comprising one or more virtualised service functions.

10. The method according to claim 1 wherein the at least one internal address allocated to the new virtualised service function type to be included in the service function chain, any internal addresses previously allocated to virtualised service functions already included in a service function chain, and any internal addresses assigned to the service function chain not currently allocated to a service function in the service function chain together form an ordered and sequential set of internal addresses assigned to the service function chain.

11. The method according to claim 1 wherein the processing module comprises and/or has access to one or more data stores.

12. The method according to claim 1 wherein the processing module is configured to provide instructions to the switching processor.

13. The method according to claim 1 wherein the processing module is configured to interact with a user interface in order to receive instructions relating to virtualised service functions to be included in and/or removed from service function chains.

14. An apparatus for implementing a service function chain comprising one or more virtualised service functions, the apparatus comprising one or more processors at least configured to in respect of at least one new type of virtualised service function to be inserted between service functions within a pre-existing service function chain:

determine a position within the pre-existing service function chain at which the new virtualised service function type is to be inserted;

in dependence on the position within the service function chain determined in respect of the new virtualised service function type, allocate to the new virtualised service function type at least one internal address selected from an ordered set of internal addresses assigned to the service function chain, the at least one internal address allocated to the new virtualised service function type being an address selected from one or more addresses in the ordered set that is not currently allocated to a service function in the service function chain and being an address to be usable by a switching processor as either a destination address or a source address, or both, when forwarding data between one or more other service functions in the service function chain and the new virtualised service function type; and provide to the switching processor an indication of the at least one internal address allocated to the new virtualised service function type, the switching processor being configured to receive data from one service function in the service function chain and to forward data to another service function in the service function chain in dependence on the one or more internal addresses allocated respectively to the one or more service functions in the service function chain.

15. A non-transitory computer-readable storage medium storing computer program code to, when loaded into a computer system and executed thereon, cause the computer system to perform the steps to implement a service function chain comprising one or more virtualised service functions, the steps comprising, in respect of at least one new type of virtualised service function to be inserted between service functions within a pre-existing service function chain:

determining a position within the pre-existing service function chain at which the new virtualised service function type is to be inserted;

in dependence on the position within the service function chain determined in respect of the new virtualised service function type, allocating to the new virtualised service function type at least one internal address selected from an ordered set of internal addresses assigned to the service function chain, the at least one internal address allocated to the new virtualised service function type being an address selected from one or more addresses in the ordered set that is not currently allocated to a service function in the service function chain and being an address to be usable by a switching processor as either a destination addressor a source address, or both, when forwarding data between one or more other service functions in the service function chain and the new virtualised service function type; and providing to the switching processor an indication of the at least one internal address allocated to the new virtualised service function type, the switching processor being configured to receive data from one service function in the service function chain and to forward data to another service function in the service function chain in dependence on the one or more internal addresses allocated respectively to the one or more service functions in the service function chain.

\* \* \* \* \*